US009293938B2

(12) United States Patent
Kasaya et al.

(10) Patent No.: US 9,293,938 B2
(45) Date of Patent: Mar. 22, 2016

(54) CHARGING CONTROL DEVICE TO PREVENT SUPPLIED POWER FROM EXCEEDING CONTRACT DEMAND

(75) Inventors: Masato Kasaya, Osaka (JP); Satoru Ueno, Osaka (JP)

(73) Assignee: Panasonic Corporation, Osaka (JP)

( * ) Notice: Subject to any disclaimer, the term of this patent is extended or adjusted under 35 U.S.C. 154(b) by 176 days.

(21) Appl. No.: 14/114,585

(22) PCT Filed: May 17, 2012

(86) PCT No.: PCT/IB2012/000962
§ 371 (c)(1),
(2), (4) Date: Oct. 29, 2013

(87) PCT Pub. No.: WO2012/168772
PCT Pub. Date: Dec. 13, 2012

(65) Prior Publication Data
US 2014/0062419 A1 Mar. 6, 2014

(30) Foreign Application Priority Data

May 20, 2011 (JP) ................................. 2011-113511

(51) Int. Cl.
*H02J 7/00* (2006.01)
*H02J 7/04* (2006.01)
(Continued)

(52) U.S. Cl.
CPC ............... *H02J 7/007* (2013.01); *B60L 3/0069* (2013.01); *B60L 3/04* (2013.01); *B60L 11/1816* (2013.01);
(Continued)

(58) Field of Classification Search
CPC ........... H02J 7/007; H02J 3/14; H02J 7/0047; H02J 7/045; B60L 3/0069; B60L 3/04; B60L 11/1824; B60L 11/1846; B60L 11/1816; B60L 11/1861; B60L 2240/80; B60L 2250/10; B60L 2240/549; B60L 2230/16; B60L 2230/12
See application file for complete search history.

(56) References Cited

U.S. PATENT DOCUMENTS 4,884,242 A * 11/1989 Lacy et al. .................... 365/229
5,162,720 A * 11/1992 Lambert ....................... 320/104
(Continued)

FOREIGN PATENT DOCUMENTS

JP      H7-298506      11/1995
JP      H08-116626     5/1996
(Continued)

OTHER PUBLICATIONS

The International Search Report for corresponding International Application No. PCT/IB2012/000962 mailed on Sep. 4, 2012.
(Continued)

*Primary Examiner* — Naum B Levin
(74) *Attorney, Agent, or Firm* — Renner, Otto, Boisselle & Sklar, LLP

(57) ABSTRACT

When a communication control unit (14) in this charging control device (1) receives an inhibition command sent by a power monitoring device (2), the communication control unit instructs a signal processing unit (10) to lower a current capacity (an upper limit for a charging current). The signal processing unit (10) reduces the duty ratio of a pilot signal. As a result, the charging power supplied to an electric vehicle (200) decreases, thus making it possible to prevent the supplied power from exceeding a contract demand and minimize problems stemming from the charging of a rechargeable battery.

20 Claims, 4 Drawing Sheets

(51) Int. Cl.
*H02J 3/14* (2006.01)
*B60L 3/00* (2006.01)
*B60L 3/04* (2006.01)
*B60L 11/18* (2006.01)

(52) U.S. Cl.
CPC ......... *B60L 11/1824* (2013.01); *B60L 11/1846* (2013.01); *B60L 11/1861* (2013.01); *H02J 3/14* (2013.01); *H02J 7/0047* (2013.01); *H02J 7/045* (2013.01); *B60L 2230/12* (2013.01); *B60L 2230/16* (2013.01); *B60L 2240/549* (2013.01); *B60L 2240/80* (2013.01); *B60L 2250/10* (2013.01)

(56) References Cited

U.S. PATENT DOCUMENTS

| | | | |
|---|---|---|---|
| 6,005,371 A * | 12/1999 | Umetsu | 320/148 |
| 6,225,776 B1 | 5/2001 | Chai | |
| 6,281,602 B1 * | 8/2001 | Got et al. | 307/66 |
| 6,677,731 B2 * | 1/2004 | Ljunggren | 320/152 |
| 6,861,824 B1 * | 3/2005 | Liu et al. | 320/164 |
| 7,622,830 B2 * | 11/2009 | Cioaca et al. | 307/152 |
| 7,656,127 B1 * | 2/2010 | Shutt et al. | 320/134 |
| 7,656,132 B2 * | 2/2010 | So et al. | 320/164 |
| 7,692,403 B2 * | 4/2010 | Chuang et al. | 320/111 |
| 7,733,061 B2 * | 6/2010 | Zemke et al. | 320/128 |
| 8,013,570 B2 * | 9/2011 | Baxter et al. | 320/109 |
| 8,190,933 B2 * | 5/2012 | Sawyers | 713/300 |
| 8,937,456 B2 * | 1/2015 | Bhageria et al. | 320/109 |
| 8,963,501 B2 * | 2/2015 | Shigemizu et al. | 320/126 |
| 9,045,048 B2 * | 6/2015 | Yukizane et al. | |
| 9,071,068 B2 * | 6/2015 | Nishikawa et al. | |
| 2002/0036430 A1 * | 3/2002 | Welches et al. | 307/18 |
| 2002/0070705 A1 | 6/2002 | Buchanan et al. | |
| 2004/0130292 A1 | 7/2004 | Buchanan et al. | |
| 2006/0108985 A1 * | 5/2006 | Kuo | 320/141 |
| 2007/0278993 A1 * | 12/2007 | Vogel | 320/107 |
| 2008/0036419 A1 * | 2/2008 | Cook et al. | 320/104 |
| 2008/0218121 A1 | 9/2008 | Gale et al. | |
| 2010/0114798 A1 | 5/2010 | Sirton | |
| 2010/0315043 A1 * | 12/2010 | Chau | 320/134 |
| 2011/0043165 A1 | 2/2011 | Kinser et al. | |
| 2011/0090726 A1 * | 4/2011 | Brotto et al. | 363/131 |
| 2012/0019196 A1 * | 1/2012 | Fung | 320/107 |
| 2012/0112696 A1 | 5/2012 | Ikeda et al. | |
| 2012/0229082 A1 * | 9/2012 | Vukojevic et al. | 320/108 |
| 2013/0127249 A1 * | 5/2013 | Ukai et al. | 307/48 |

FOREIGN PATENT DOCUMENTS

| | | |
|---|---|---|
| JP | 2007-535282 | 11/2007 |
| JP | 2009-273262 | 11/2009 |
| JP | 2010-115051 | 5/2010 |
| JP | 2010-119208 | 5/2010 |
| JP | 2010-166768 | 7/2010 |
| JP | 2011-83093 | 4/2011 |
| WO | 2011/007573 | 1/2011 |

OTHER PUBLICATIONS

The Written Opinion for corresponding International Application No. PCT/IB2012/000962 dated Sep. 4, 2012.
Extended European Search Report dated Jun. 5, 2015 issued in a corresponding European Patent Application No. 12797247.9.
Japanese Office Action dated Jan. 5, 2016 issued in corresponding Japanese Patent Application No. 2011-113511 and English summary thereof.

* cited by examiner

CHARGING CONTROL DEVICE TO PREVENT SUPPLIED POWER FROM EXCEEDING CONTRACT DEMAND

FIELD OF THE INVENTION

The present invention relates to a charging control device and a charging control system.

BACKGROUND OF THE INVENTION

As a conventional example, there is a charging system disclosed in, e.g., Patent Document 1. The charging system includes a charging cable unit and a display device. The charging cable unit connects a commercial power system with an emergency battery device or an electric vehicle (including a plug-in hybrid electric car), which includes a rechargeable battery, to supply charging power to the emergency battery device or the electric vehicle (hereinafter, referred to as "electric vehicle or the like"). The charging cable unit is provided with a transmission device for transmitting, between the charging cable unit and the electric vehicle or the like, charging information on the battery to the display device.

The display device receives the charging information transmitted from the transmission device of the charging cable unit, and displays the received charging information on a display such as a liquid crystal monitor. Accordingly, the charging state of the battery can be recognized even in a remote place from the electric vehicle or the like.

[Patent Document 1] Japanese Patent Application Publication No. 2010-115051.

Meanwhile, a charging current required for charging the electric vehicle or the like is usually larger than the current consumption of general electric appliances such as a television receiver, a refrigerator and an air conditioner. Therefore, when the electric vehicle or the like is charged at the same time as the electric appliances are being used, the current supplied from the power system is greatly increased. When the current supplied from the power system (current consumption) is greatly increased, an electric cable used in wirings may need to be replaced by a high capacity one or a contract demand with an electric power company may need to be changed. If no action is taken, there arises a concern that an overload current flows and thus a main breaker of a distribution board or a limiter installed by the electric power company operates to stop the power supply.

In the conventional example disclosed in Patent Document 1, it is possible to recognize the charging state of the electric vehicle or the like, but it cannot prevent the occurrence of inconvenience (the stop of the power supply, change of the contract demand, replacement of the electric cable, or the like) due to the charging of the electric vehicle or the like, as described above.

SUMMARY OF THE INVENTION

In view of the above, it is an object of the present invention to prevent the occurrence of inconvenience due to the charging of the battery.

In accordance with the present invention, there is provided a charging control device for controlling charging of a battery with power supplied from a power system, the charging control device including: an adjusting unit configured to adjust a charging power supplied to the battery such that a supply power supplied from the power system is equal to or lower than a threshold value.

In the charging control device, the adjusting unit may instruct a change of an upper limit of a charging current of the battery.

In accordance with the present invention, there is provided a charging control system, including: at least one charging control device; and a power monitoring device configured to monitor the power supplied from the power system, wherein the power monitoring device includes: a measuring unit configured to measure a supply current supplied from the power system; and a control unit configured to notify the charging control device of a measured value of the supply power calculated based on the supply current measured by the measuring unit.

In accordance with the present invention, there is provided a charging control system, comprising: at least one charging control device; and a power monitoring device configured to monitor the power supplied from the power system, wherein the power monitoring device includes: a measuring unit configured to measure a supply current supplied from the power system; and a control unit configured to control the adjusting unit of the charging control device to adjust the charging power such that a measured value of the supply power calculated based on the supply current measured by the measuring unit is equal to or lower than the threshold value.

In the charging control system, the number of the charging control device may be two or more and the control unit may set a priority order with respect to the charging control devices, and may first adjust the charging power of the charging control device with a lower priority order.

In the charging control system, the number of the charging control device may be two or more and the control unit may uniformly adjust the charging powers of the charging control devices.

The charging control system may further include a notification device configured to notify stage-by-stage a state in which the adjusting unit adjusts the charging power.

In the charging control system, the notification device may notify the measured value of the supply power.

EFFECT OF THE INVENTION

The charging control device and the charging control system has an effect of preventing the occurrence of inconvenience due to the charging of the battery.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, embodiments, in which a technical idea of the present invention is applied to a charging control device and a charging control system, installed at a house, for controlling the charging of a rechargeable battery of an electric vehicle with power supplied from a power system, will be described in detail with reference to the accompanying drawings. Throughout the drawings, like part or similar parts will be designated by like reference symbols, and redundant descriptions thereof will be omitted.

The rechargeable battery as a charging control target is not limited to the battery of the electric vehicle, but may include, e.g., a battery of an emergency battery device as described in the "Background of the Invention". Such battery is composed of one or more battery cells.

Figure 1:
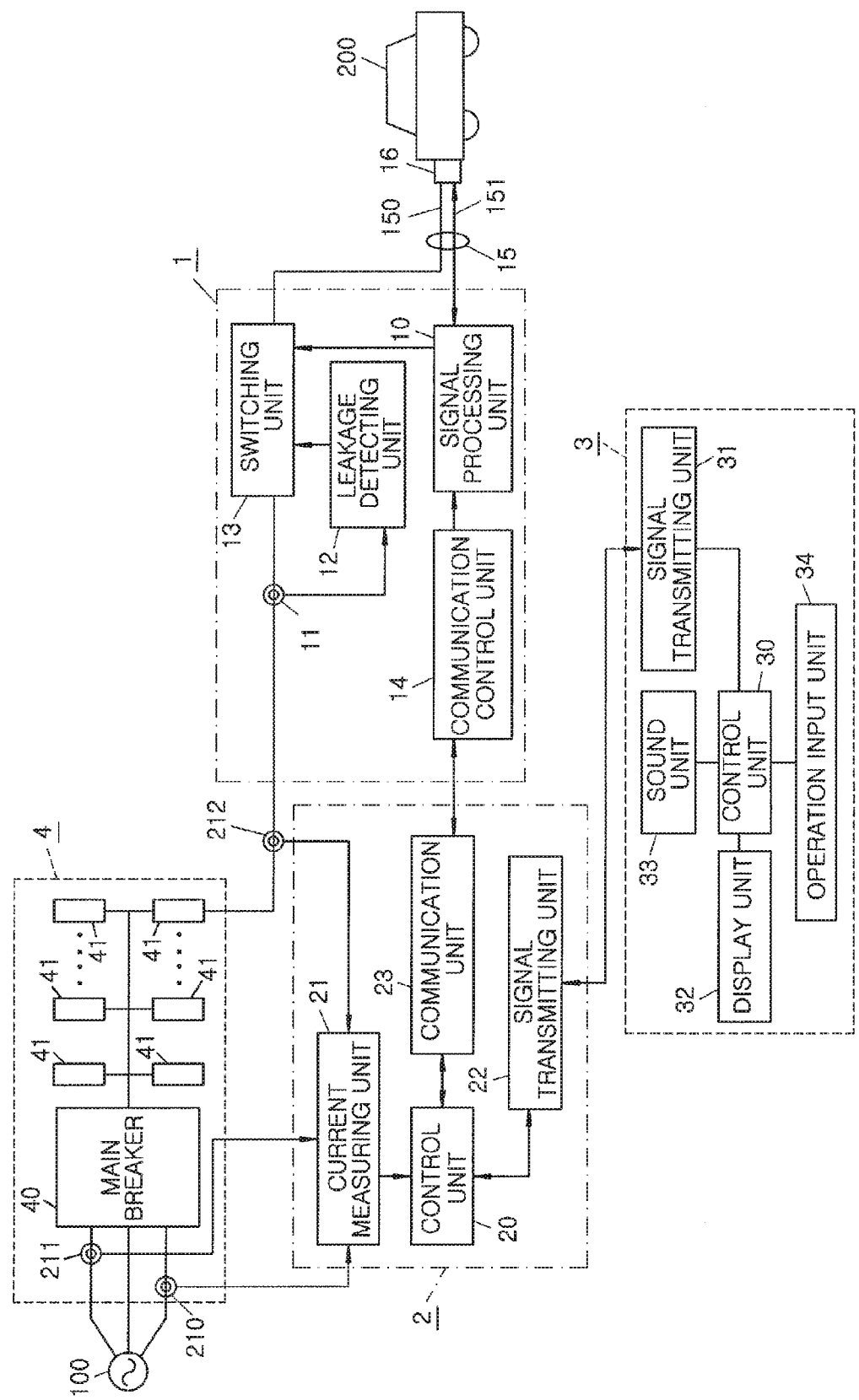
FIG. 1 is a system block diagram representing an embodiment of a charging control device and a charging control system in accordance with the present invention.

As shown in FIG. 1, alternating current (AC) power of a single-phase three wire system is supplied from a power system 100 to a house through a house distribution board 4. The house distribution board 4 includes a main breaker 40 whose primary side is connected to the power system 100, and a plurality of branch breakers 41 connected to a secondary side of the main breaker 40. Herein, a limiter (current limiter) may be inserted in the primary side of the main breaker 40. In addition, a socket or a load (lighting device, electronic cooker or the like) is connected to a secondary side of each of the branch breakers 41 through house wirings, but illustrations thereof is omitted.

A charging control system in accordance with the present embodiment includes, as shown in FIG. 1, a charging control device 1, a power monitoring device 2 and a notification device 3.

The power monitoring device 2 includes a control unit 20, a current measuring unit 21, a signal transmitting unit 22 and a communication unit 23. The current measuring unit 21 measures currents flowing through two wires, other than the neutral line, among three wires connected to the primary side of the main breaker 40, by using current sensors 210 and 211, and outputs the measured values to the control unit 20. The control unit 20 has a microcomputer as a main component and calculates a measured value of power supplied from the power system 100 (supply power) such as an instant value or an accumulated value of the supply power, based on the current value measured by the current measuring unit 21 and a measured value (voltage value) of a voltage (input voltage) on the primary side of the main breaker 40. The signal transmitting unit 22 transmits a signal to the notification device 3. The communication unit 23 communicates with the charging control device 1, e.g., performs serial communication in conformity to RS485 standard. The communication method of the communication unit 23 is not limited to RS485 standard, but may include a power line carrier communication, a wireless communication (e.g., low power wireless communication) and the like.

The charging control device 1 includes a signal processing unit 10, a zero phase current transformer 11, a leakage detecting unit 12, a switching unit 13, a communication control unit 14, a charging cable 15 and a charging connector 16. The charging control device 1 is installed at a place close to a parking space (garage) of an electric vehicle 200, and is connected to one (the branch breaker 41 at the right bottom in the house distribution board 4 in FIG. 1) of branch circuits of the branch breakers 41 of the house distribution board 4. The charging cable 15 has a power supply line 150 through which a current to be supplied to the electric vehicle 200 flows and a transmission line 151 through which a pilot signal to be later described is transmitted. The power supply line 150 and the transmission line 151 are covered by an insulating sheath. The charging connector 16 is arranged at the leading portion of the charging cable 15. The charging connector 16 is detachably inserted into an inlet provided in the body of the electric vehicle 200. When the charging connector 16 is inserted into the inlet, it becomes possible to supply a power from the power system 100 through the house distribution board 4 and the charging control device 1, and to transmit the pilot signal between the signal processing unit 10 of the charging control device 1 and an electronic control unit (ECU) for charging of the electric vehicle 200.

The switching unit 13 has an electronic relay (not shown) provided on a power supply path between the branch breaker 41 and the power supply line 150 and opens/closes the power supply path by turning off/on the electronic relay in accordance with an instruction of the signal processing unit 10. The leakage detecting unit 12 detects an unbalanced current flowing through the power supply path by using the zero phase current transformer 11. When the detected level of the unbalanced current exceeds a threshold value, the leakage detecting unit 12 determines that the leakage has occurred and controls the switching unit 13 to open the power supply path. The communication control unit (adjustment unit) 14 has a function (communication function) of performing communication (serial communication based on RS485 standard) with the communication unit 23 of the power monitoring device 2, and a function (adjustment function) of adjusting a charging current to be supplied to the electric vehicle 200 as to be later described. The communication control unit 14 includes a microcomputer and an integrated circuit for serial communication. The power monitoring device 2 measures a current (charging current) to be supplied to the electric vehicle 200 through the charging control device 1 by using a current sensor 212.

Figure 3:
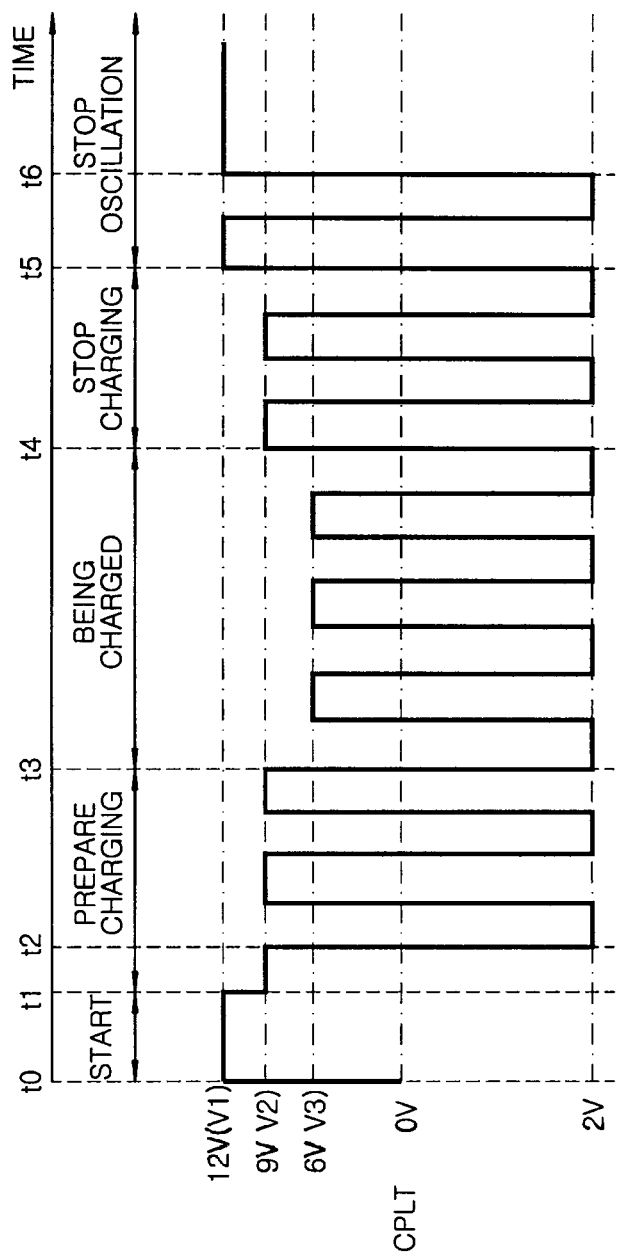
FIG. 3 is a time chart for explaining a basic charging control operation of the charging control device in the system block diagram.

Hereinafter, a basic charging control operation of the charging control device 1 will be described with reference to a time chart of FIG. 3. When the charging connector 16 is connected to the inlet of the electric vehicle 200 at time to, a predetermined voltage V1 (e.g., V1=12V) is applied from the signal processing unit 10 to the transmission line 151. Then, the voltage applied to the transmission line 151 acts as a transmission medium for a control pilot signal (CPLT) (hereinafter, referred to as "pilot signal"), and in accordance with a level of the voltage and duty ratio, a variety of information is exchanged between the ECU and the signal processing unit 10 as to be later described.

When detecting a pilot signal of the voltage V1, the ECU lowers a voltage level of the pilot signal from V1 to V2 (e.g., V2=9V) (from time t1 to time t2). When detecting that the pilot signal has been lowered from V1 to V2, the signal processing unit 10 outputs a pulsed pilot signal having a predetermined frequency (e.g., 1 kHz) (from time t2). The corresponding pilot signal has a signal level of ±V1, but an upper level has been decreased to V2. A duty ratio of the pilot signal represents an upper limit of the charging current (a current capacity of the charging control device 1) and is previously set in every charging control device 1. For example, the duty ratio is set to 20% when the current capacity is 12 ampere (A), and the duty ratio is set to 50% when the current capacity is 30 A. When the duty ratio of the pilot signal is detected and the current capacity is recognized, the ECU lowers the voltage level of the pilot signal from V2 to V3 (e.g., 6V) (at time t3). When detecting that the pilot signal has been lowered from V2 to V3, the signal processing unit 10 closes the switching unit 13 to start the supply of the charging power.

The ECU sets a current value (equal to or smaller than the current capacity of the charging control device 1) for charging the battery up to a target charging level based on the current capacity and outputs a charging command to a charger (not shown) provided in the electric vehicle 200. The charger, which has received the charging command, charges the battery while adjusting the charging current not to exceed the current value set by the ECU (from time t3). When the charging of the battery reaches the target charging level, the ECU outputs a charging stop command to the charger to terminate the charging of the battery, and returns the voltage level of the pilot signal from V3 to V2 (at time t4). The charger, which has received the charging stop command, terminates the charging of the battery.

When detecting that the pilot signal has been changed from V3 to V2, the signal processing unit 10 opens the switching unit 13 to stop the supply of AC power. The ECU returns the voltage level of the pilot signal to V1 which is an initial value (at time t5). When the voltage level of the pilot signal is returned to V1, the signal processing unit 10 stops the oscillation of the predetermined frequency to maintain the voltage level of the pilot signal at V1 and thus returns to a standby state (at time t6).

As described above, the charging control device 1 controls the charging of the battery cells of the battery provided in the electric vehicle 200 by giving the ECU of the electric vehicle 200 the upper limit of the charging current when starting or stopping the supply of the charging power to the electric vehicle 200.

The notification device 3 includes a control unit 30, a signal transmitting unit 31, a display unit 32, a sound unit 33 and an operation input unit 34. The signal transmitting unit 31 transmits a signal to the signal transmitting unit 22 of the power monitoring device 2. The display unit 32 has a display element formed of light emitting diodes and a light emitting circuit for allowing the display element to emit light under the control of the control unit 30. A two-dimensional display device such as a liquid crystal monitor, an organic electroluminescence (EL) display or the like may be used as a substitute for the light emitting diodes. The sound unit 33 has a speaker and a driving circuit for driving the speaker. The operation input unit 34 has a push button switch, and outputs an operation signal when the push button switch is pushed.

The control unit 30 includes a microcomputer as a main component, and has a notification function of notifying, by controlling the display unit 32 or the sound unit 33, a user (a resident) of monitoring information received from the power monitoring device 2 via the signal transmitting unit 31. The control unit 30 further has a control function of transmitting a control command, which is generated according to the operation signal outputted from the operation input unit 34, to the power monitoring device 2 via the signal transmitting unit 31. The details of the notification function and the control function will be later described.

Figure 2:
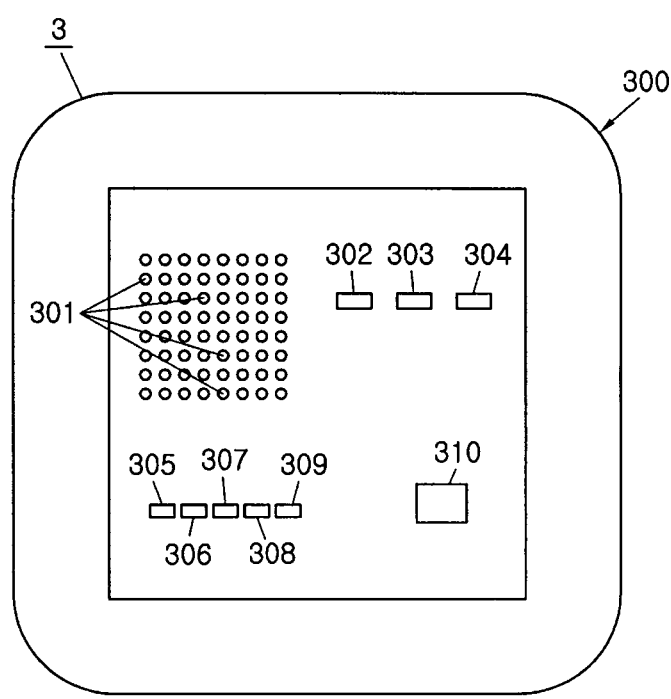
FIG. 2 is a front view of a notification device in the system block diagram.

In the notification device 3, as shown in FIG. 2, the control unit 30, the signal transmitting unit 31, the display unit 32, the sound unit 33 and the operation input unit 34 are accommodated in a device body 300 embedded in a wall or the like in the house. At the left upper portion on the front surface of the device body 300, there are provided, e.g., a plurality of sound holes 301 through which a sound emitted from the sound unit 33 passes. At the right side of the sound holes 301 on the front surface of the device body 300, three light transmission holes 302, 303 and 304 are arranged in a horizontal line, and lights radiated from three of the light emitting diodes included in the display unit 32 are transmitted toward the front through the light transmission holes 302, 303 and 304. Below the sound holes 301 on the front surface of the device body 300, five light transmission holes 305 to 309 are arranged in a horizontal line, and lights radiated from five of the light emitting diodes included in the display unit 32 are transmitted toward the front through the light transmission holes 305 to 309.

Further, at the right lower portion on the front surface of the device body 300, a switch operation unit 310 for operating the push button switch of the operation input unit 34 is provided.

Figure 4:
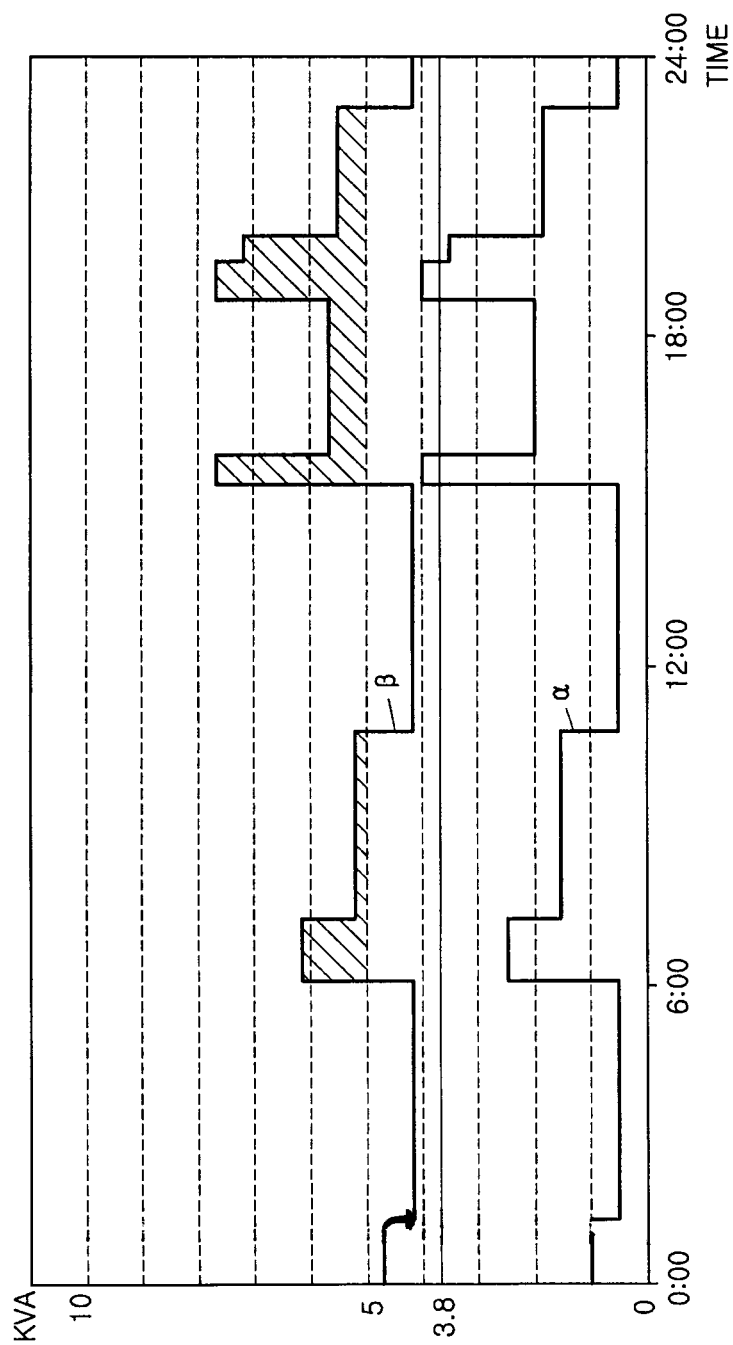
FIG. 4 is an explanatory view for explaining the relationship between a contract demand and a supply power.

Meanwhile, a large charging current of ten and several amperes to several tens amperes is usually required to charge the battery provided in the electric vehicle 200 (hereinafter, referred to as "charging of the electric vehicle 200"). In FIG. 4, the horizontal axis represents the time of one day from 0 to 24, and the vertical axis represents the supply power (unit: kVA). In FIG. 4, the supply power data of one day (24 hours) in the house is dividedly depicted in the following two cases: a case where the electric vehicle 200 is not charged (see a broken line a); and a case where the electric vehicle 200 is charged (see a broken line β). Further, in FIG. 4, it is assumed that the power (the charging power) required to charge the electric vehicle 200 is 3.8 kVA (=200 V×19 A) and the charging is continuously performed for 24 hours.

Here, if a contract demand (the upper limit of the supply power (instant value) determined by the contract with the electric power company) is 5 kVA, in the case where the electric vehicle 200 is not charged, the maximum value of the supply power is 4 kVA in the time zone from evening to night and does not exceed the contract demand, as shown in the broken line α. However, in the case where the electric vehicle 200 is charged, there is a concern that the sum of the charging power and the consumption power consumed by loads other than the electric vehicle 200 may exceed the contract demand in the morning time zone and in the time zone from evening to night, as shown in the broken line p (see hatched portions in FIG. 4). If the supply power exceeds the contract demand, the main breaker 40 or the limiter operates to stop the supply of the power.

In the present embodiment, if it is determined that there is a high possibility that the supply power will exceed the contract demand in the control unit (control means) 20 of the power monitoring device 2, a charging power inhibition command is transmitted from the control unit 20 to the charging control device 1 via the communication unit 23. For example, the control unit 20 transmits the charging power inhibition command to the charging control device 1 when the supply power measured by the current measuring unit 21 (the sum of the charging power of the electric vehicle 200 and the power consumed by loads other than the electric vehicle 200) exceeds a threshold value set lower than the contract demand. However, when the charging current measured by the current measuring unit 21 (the current detected by the current sensor 212) is regarded as nearly zero, the control unit 20 determines that the charging to the electric vehicle is not being performed and does not transmit the charging power inhibition command.

In the charging control device 1, the communication control unit 14 receives the charging power inhibition command transmitted from the power monitoring device 2 and instructs the signal processing unit 10 to lower the current capacity (the upper limit of the charging current). Then, the signal processing unit 10 receives the instruction from the communication control unit 14 and reduces the duty ratio of the pilot signal. For example, if the current capacity of the charging control device 1 is 30 A, the duty ratio is decreased from the initial 50% to a value between 40% and 20%. As a result, the current capacity is changed to a lower value than the initial 30 A.

The ECU of the electric vehicle 200 sets a second current value of the charging current based on the changed current capacity and outputs a charging command to the charger. The charger, which has received the charging command, charges the battery while adjusting the charging current not to exceed the second current value set by the ECU. Consequently, the charging power supplied to the electric vehicle 200 is decreased, so that it is avoided that the supply power exceeds the contract demand.

As described above, the charging control device 1 includes an adjusting unit (the communication control unit 14) which adjusts the charging power supplied to the battery (the electric vehicle 200) such that the supply power supplied from the power system 100 is equal to or lower than a predetermined threshold value. Therefore, an occurrence of inconvenience due to the charging of the battery can be prevented.

Information on the margin of the supply power (a value after subtracting a measured value of the supply power from the threshold value) is notified from the control unit 20 of the power monitoring device 2 to the communication control unit 14 of the charging control device 1, and the communication control unit 14 may control the upper limit of the charging current (current capacity) based on the margin of the supply power. Alternatively, only the measured value of the supply power is notified from the control unit 20, and the communication control unit 14 may calculate the margin of the supply power from the threshold value and the measured value of the supply power. In this case, the power monitoring device 2 performs only monitoring of the supply power, and the communication control unit 14 of the charging control device 1 performs adjustment of the charging power and determination of the necessity thereof. When the margin of the supply power is extremely small, the communication control unit 14 may instruct the signal processing unit 10 to stop charging.

Next, the operation of the notification device 3 will be described. The control unit 20 of the power monitoring device 2 frequently calculates the ratio of the measured value of the supply power to the contract demand (=the measured value of the supply power÷the contract demand×100%) and transmits the calculation result, as monitoring information, from the signal transmitting unit 22 to the notification device 3. In the notification device 3, the control unit 30 controls the display unit 32 to notify (display) the monitoring information received from the power monitoring device 2 via the signal transmitting unit 31. In other words, with respect to the light emitting diodes, among the plurality of light emitting diodes included in the display unit 32, corresponding to the five light transmission holes 305 to 309 which are arranged side by side in a horizontal direction on the front surface of the device body 300 of the notification device 3, the control unit 30 controls the light emitting diodes to light up in a predetermined number according to the above ratio. For example, one of the light emitting diodes lights up if the ratio is lower than 20%, two of the light emitting diodes light up if the ratio is between 20% and 40%, three of the light emitting diodes light up if the ratio is between 40% and 60%, four of the light emitting diodes light up if the ratio is between 60% and 80%, and the five light emitting diodes all light up if the ratio is more than 80%. Therefore, it is possible to notify a user of approximate measured value of the supply power at the present.

The control unit 20 of the power monitoring device 2 notifies stage-by-stage (e.g., three stages: no adjusting, adjusting and stop) the state in which the communication control unit 14 of the charging control device 1 adjusts the charging power. The control unit 20 transmits different monitoring information from the signal transmitting unit 22 depending on the cases: "no adjusting" in a case where the charging power inhibition command is not generated; "adjusting" in a case where the charging power inhibition command is generated; and "forced stop" in a case where the measured value of the charging current becomes zero after the charging power inhibition command is generated.

In the notification device 3, the control unit 30 controls the display unit 32 to notify (display) the monitoring information received from the power monitoring device 2 via the signal transmitting unit 31. In other words, with respect to the light emitting diodes, among the plurality of light emitting diodes included in the display unit 32, corresponding to the three light transmission holes 302 to 304 which are provided on the front surface of the device body 300 of the notification device 3, the control unit 30 controls any one of the light emitting diodes corresponding to the monitoring information to light up. For example, the light emitting diode corresponding to the left light transmission hole 302 lights up in the case of "no adjusting", the light emitting diode corresponding to the central light transmission hole 303 lights up in the case of "adjusting", and the light emitting diode corresponding to the right light transmission hole 304 lights up in the case of "forced stop". Therefore, the adjustment state of the charging power is notified.

Moreover, the monitoring information may be notified to a user by using a sound (buzzer, voice or the like) coming out from a speaker of the sound unit 33 as well as the display of the display unit 32.

Here, if the switch operation unit 310 provided on the front surface of the device body 300 is pushed, an operation signal is outputted from the operation input unit 34 to the control unit 30. The control unit 30 having received the operation signal transmits, from the signal transmitting unit 31, a command for forbidding the charging of the electric vehicle 200 (a charging forbidding command). The control unit 20 of the power monitoring device 2 transmits, from the communication unit 23 to the charging control device 1, the charging forbidding command received through the signal transmitting unit 22. The communication control unit 14 of the charging control device 1 receives the charging forbidding command from the power monitoring device 2 and delivers the same to the signal processing unit 10. When receiving the charging forbidding command, the signal processing unit 10 does not close the switching unit 13 even if it is detected that the signal level of the pilot signal has decreased from V2 to V3.

Further, if the switch operation unit 310 of the notification device 3 is secondly pushed to output an operation signal from the operation input unit 34 to the control unit 30, the control unit 30 having received the operation signal transmits, from the signal transmitting unit 31, a command for canceling the forbiddance of the charging (a charging forbiddance canceling command). When the charging forbiddance canceling command is transmitted from the power monitoring device 2 to the signal processing unit 10 via the communication control unit 14 of the charging control device, the signal processing unit 10 closes the switching unit 13 when it is detected that the signal level of the pilot signal has decreased from V2 to V3.

In other words, during a period after the charging forbidding command is transmitted by the first push of the switch operation unit 310 of the notification device 3 until the charging forbiddance canceling command is transmitted by the second push of the switch operation unit 310, the supply of the charging power in the charging control device 1 is forcedly stopped. Thus, if the charging control device 1 is set as being in the above-described charging forbidding state while the electric vehicle 200 is driven outside, it can be prevented that another person connects the charging cable 15 to his or her electric vehicle to charge it (stealing electricity). The control unit 20 having received the charging forbidding command may turn off a switch (not shown) provided between the signal processing unit 10 and the transmission line 151 to set the charging control device 1 as being in the charging forbidding state.

If a plurality of the charging control devices 1 is installed, each of the communication control units 14 of the charging control devices 1 is bus-connected to the communication unit 23 of the power monitoring device 2. Accordingly, the communication control units 14 of all the charging control devices 1 can receive the charging power inhibition command transmitted through the communication unit 23 from the control unit 20 of the power monitoring device 2. The power monitoring device 2 and each of the charging control devices 1 are assigned their own address, and thus the power monitoring device 2 and each of the charging control devices 1 can perform one-to-one communication with each other by designating the address.

When the plurality of the charging control devices 1 is installed, the charging power is inhibited by using, e.g., the following two methods: in a first method, the control unit 20 of the power monitoring device 2 sets priority order with respect to the charging control devices 1 (electric vehicles 200), and when the measured value of the supply power exceeds the threshold value, the charging power of the charging control device with the lower priority order is first adjusted (inhibited); and in a second method, when the measured value of the supply power exceeds the threshold value, the control unit 20 of the power monitoring device 2 uniformly adjusts (inhibits) the charging power with respect to all the charging control devices 1 that is being charged. It is preferable that the two methods can be optionally selected. Further, different methods other than the above-described two methods may be adopted.

While preferred embodiments of the present invention has been described above, the present invention is not limited to those specific embodiments but can be changed and modified in many different forms without departing from the scope of the claims. Such changes and modifications shall be construed to fall within the scope of the present invention.

What is claimed is:

1. A charging control system, comprising:
   one or more charging control devices, each of the charging control devices being configured to control charging of a battery with a supply power supplied from a power system and including an adjusting unit configured to adjust a charging power supplied to the battery such that the supply power is equal to or lower than a threshold value;
   a power monitoring device configured to monitor the supply power; and
   a notification device connected to the power monitoring device and including an operation unit;
   wherein, in response to a manipulation of the operation unit, the notification device generates a charging forbidding command or a charging forbiddance canceling command and, in response thereto, the charging of the battery is enabled and disabled by each of the charging control devices.

2. The charging control system of claim 1, wherein the adjusting unit adjusts the charging power by instructing a change of an upper limit of a charging current of the battery.

3. The charging control system of claim 2,
   wherein the power monitoring device includes:
      a measuring unit configured to measure a supply current supplied from the power system; and
      a control unit configured to calculate a value of the supply power based on the measured supply current and notify the charging control devices of the calculated value of the supply power.

4. The charging control system of claim 3, wherein-the number of the charging control devices is two or more and the control unit sets a priority order with respect to the charging control devices, and first adjusts the charging power of the charging control device with a lower priority order.

5. The charging control system of claim 3, wherein-the number of the charging control devices is two or more and the control unit uniformly adjusts the charging powers of the charging control devices.

6. The charging control system of claim 3, wherein the notification device is configured to notify stage-by-stage a state in which the adjusting unit adjusts the charging power.

7. The charging control system of claim 2,
   wherein the power monitoring device includes:
      a measuring unit configured to measure a supply current supplied from the power system; and
      a control unit configured to calculate a value of the supply power based on the measured supply current and control the adjusting unit to adjust the charging power such that the calculated value of the supply power is equal to or lower than the threshold value.

8. The charging control system of claim 7, wherein-the number of the charging control devices is two or more and the control unit sets a priority order with respect to the charging control devices, and first adjusts the charging power of the charging control device with a lower priority order.

9. The charging control system of claim 7, wherein-the number of the charging control devices is two or more and the control unit uniformly adjusts the charging powers of the charging control devices.

10. The charging control system of claim 7, wherein the notification device is configured to notify stage-by-stage a state in which the adjusting unit adjusts the charging power.

11. The charging control system of claim 1,
    wherein the power monitoring device includes:
       a measuring unit configured to measure a supply current supplied from the power system; and
       a control unit configured to calculate a value of the supply power based on the measured supply current and notify the charging control devices of the calculated value of the supply power.

12. The charging control system of claim 11, wherein-the number of the charging control devices is two or more and the control unit sets a priority order with respect to the charging control devices, and first adjusts the charging power of the charging control device with a lower priority order.

13. The charging control system of claim 11, wherein-the number of the charging control devices is two or more and the control unit uniformly adjusts the charging powers of the charging control devices.

14. The charging control system of claim 11, wherein the notification device is configured to notify stage-by-stage a state in which the adjusting unit adjusts the charging power.

15. The charging control system of claim 14, wherein the notification device notifies the measured value of the supply power.

16. The charging control system of claim 1,
    wherein the power monitoring device includes:
       a measuring unit configured to measure a supply current supplied from the power system; and
       a control unit configured to calculate a value of the supply power based on the supply current measured by the measuring unit and control the adjusting unit to adjust the charging power such that the calculated value of the supply power is equal to or lower than the threshold value.

17. The charging control system of claim 16, wherein the number of the charging control devices is two or more and the control unit sets a priority order with respect to the charging control devices, and first adjusts the charging power of the charging control device with a lower priority order.

18. The charging control system of claim 16, wherein the number of the charging control devices is two or more and the control unit uniformly adjusts the charging powers of the charging control devices.

19. The charging control system of claim 16, wherein the notification device is configured to notify stage-by-stage a state in which the adjusting unit adjusts the charging power.

20. The charging control system of claim 19, wherein the notification device notifies the measured value of the supply power.

* * * * *